United States Patent
Batur

(10) Patent No.: US 10,885,188 B1
(45) Date of Patent: Jan. 5, 2021

(54) REDUCING FALSE POSITIVE RATE OF STATISTICAL MALWARE DETECTION SYSTEMS

(71) Applicant: Comodo Security Solutions, Inc., Clifton, NJ (US)

(72) Inventor: Berker Batur, Ankara (TR)

(*) Notice: Subject to any disclaimer, the term of this patent is extended or adjusted under 35 U.S.C. 154(b) by 84 days.

(21) Appl. No.: 15/858,611

(22) Filed: Dec. 29, 2017

Related U.S. Application Data

(60) Provisional application No. 62/440,553, filed on Dec. 30, 2016.

(51) Int. Cl.
*G06F 21/00* (2013.01)
*G06F 21/56* (2013.01)

(52) U.S. Cl.
CPC .......... *G06F 21/565* (2013.01); *G06F 21/564* (2013.01)

(58) Field of Classification Search
CPC combination set(s) only.
See application file for complete search history.

(56) References Cited

U.S. PATENT DOCUMENTS

| | | | |
|---|---|---|---|
| 7,290,282 B1 | 8/2007 | Renert et al. | |
| 7,640,589 B1 | 12/2009 | Mashevsky et al. | |
| 8,028,338 B1* | 9/2011 | Schneider | G06F 21/564 713/188 |
| 8,087,086 B1 | 12/2011 | Lai et al. | |
| 8,627,469 B1 | 1/2014 | Chen et al. | |
| 8,635,171 B1 | 1/2014 | Kennedy | |
| 8,745,760 B2 | 6/2014 | Poulson | |
| 8,914,889 B2 | 12/2014 | Niemela | |
| 8,995,758 B1 | 3/2015 | Bissacco et al. | |
| 9,143,518 B2* | 9/2015 | Sidiroglou | H04L 63/1416 |
| 9,152,789 B2* | 10/2015 | Natarajan | H04L 63/1416 |
| 9,166,994 B2* | 10/2015 | Ward | H04L 63/1425 |
| 9,609,015 B2* | 3/2017 | Natarajan | H04L 63/145 |
| 9,959,407 B1* | 5/2018 | Li | G06N 20/00 |
| 10,057,279 B1* | 8/2018 | Balduzzi | H04L 63/145 |
| 10,437,999 B1* | 10/2019 | Bhattacharyya | G06F 21/568 |
| 2012/0084859 A1* | 4/2012 | Radinsky | G06Q 10/06 726/23 |
| 2012/0180126 A1* | 7/2012 | Liu | G06F 11/3058 726/22 |
| 2012/0210423 A1* | 8/2012 | Friedrichs | H04L 63/1416 726/22 |

(Continued)

OTHER PUBLICATIONS

Chandrasekar Ravi, R Manoharan Malware Detection using Windows Api Sequence and Machine Learning International Journal of Computer Applications (0975-8887) vol. 43—No. 17, Apr. 2012 Department of Computer Science and Engineering, Pondicherry Engineering College.

(Continued)

*Primary Examiner* — Andrew J Steinle
(74) *Attorney, Agent, or Firm* — Joseph P. Aiena

(57) ABSTRACT

There is provided a method of reducing false positive rate by using available contextual information on any sample, such as file name of the sample at a client machine, file path folder structure of the sample at client machine, download location of the sample and others, thus narrowing down the search space in first step of generic statistical classification and introducing new specific classifiers deliberately trained for each case.

4 Claims, 8 Drawing Sheets

(56) References Cited

U.S. PATENT DOCUMENTS

| | | | | |
|---|---|---|---|---|
| 2012/0260342 A1* | 10/2012 | Dube | | G06F 21/564 726/24 |
| 2012/0323829 A1* | 12/2012 | Stokes | | G06K 9/6224 706/12 |
| 2013/0276114 A1* | 10/2013 | Friedrichs | | G06F 21/567 726/23 |
| 2014/0090061 A1* | 3/2014 | Avasarala | | G06F 21/56 726/24 |
| 2016/0182502 A1* | 6/2016 | Smith | | G06F 21/316 726/7 |
| 2016/0381042 A1* | 12/2016 | Zhang | | H04L 63/1416 726/24 |
| 2017/0054745 A1* | 2/2017 | Zhang | | H04L 67/06 |
| 2017/0279698 A1* | 9/2017 | Sartran | | H04L 43/0823 |
| 2017/0374090 A1* | 12/2017 | McGrew | | G06N 20/00 |

OTHER PUBLICATIONS

Mamoun Alazab , Sitalakshmi Venkatraman , Paul Watters, and Moutaz Alazab Zero-day Malware Detection based on Supervised Learning Algorithms of API call Signatures Proceedings of the 9-th Australasian Data Mining Conference (AusDM'11) Internet Commerce Security Laboratory, School of Science, Information Technology & Engineering University of Ballarat School of Information Technology, Deakin University.

Thomas Parsons, A False Positive Prevention Framework for Non0Heuristic Anti-Virus Signatures, Symantec, A Case Study, 2009, Dissertation submitted to University of Dublin in partial fulfillment of the requirements for MSc in Management Information Systems.

Kent Griffin, Schott Schneider, Xin Hu, and Tzi-Cker Chiueh Automatic Generation of String Signatures for Malware Detection Symantec Research Laboratories 2009.

Anusha Damodaran, Fabio Di Troia, Corrado Aaron Visaggio, Thomas H. Austin, Mark Stamp A Comparison of Static, Dynamic, and Hybrid Analysis for Malware Detection Springer-Verlag France 2015.

Vinod P., V. Laxmi, and M.S. Gaur Survey on Malware Detection Methods, Survey on malware Detection Methods, Hack.in 2009, 3rd Hackers' Workshop on Computer and Internet Security Mar. 17, 2009, pp. 74-79, Organized by Prabhu Goel Research Centre for Computer and Internet Security Department of Computer Engineering, Malaviya National Institute of Technology—Jaipur, Rahasthan.

* cited by examiner

REDUCING FALSE POSITIVE RATE OF STATISTICAL MALWARE DETECTION SYSTEMS

CROSS REFERENCE TO RELATED APPLICATIONS

This application claims the benefit of and priority to U.S. Provisional Application Ser. No. 62/440,553 filed on Dec. 30, 2016 and incorporated by reference herein in its entirety.

FIELD OF THE INVENTION

The present invention relates to statistical malware detection systems, and more particularly to reducing false positives.

BACKGROUND

The traditional approach in statistical sample classification methods is to collect labelled training samples first and then generate classification model for upcoming unknown samples in order to predict their classes based on previously seen samples. In this approach features are determined at early phases of model generation by comparing each extractable feature as how it appears in one class to other one. There are also some common methods that automatically select discriminator features while generating the classification model. But except from those features that some executable script extracts from sample itself automatically, any other information being taken into account in model generation and very basic generic statistical classifier is mostly modelled. Different statistical malware classification studies use different kind of features but in all studies this classification process consists of one step classification.

So existing methods lack of using any sub-set of samples labelled by trusted verdict sources as training sets of new context aware classifiers with available contextual information that can be collected apart from binary itself. Periodic re-training procedures of existing statistical classification systems have only the step of adding newly labelled samples from trusted verdict source into existing training sets and re-train their classification models. This conventional approach leads to missing the discriminator value of some smaller sub-sets of their training repository by attenuating some additional contextual information coming from sources other than binary file itself and its extracted/generated features.

Thus there is a need for a reliable method for more precise file classification that would lead to avoiding false positives in malware detection systems.

SUMMARY OF THE INVENTION

The current invention is a method and system for reducing false positive rate of statistical malware detection systems by using available context data that can be collected (and already being collected) by cloud based malware analysis systems.

Commonly used heuristic malware analysis systems running at cloud take a binary sample and perform classification steps after feature generation and extraction. By introducing additional data collected from clients' endpoints, this new analysis system is able to execute an additional correction step on heuristic analysis result.

Advantage of proposed correction step is in using additional data gathered from client and related to binary itself, and thus automatically improve performance of classification due to narrowed search feature vector space.

In this invention new classifiers are applied to a subset of samples (which have malware verdict at first analysis step) and initial verdict will be improved in terms of reducing false positives. Enhanced heuristic analysis systems using proposed approach generate less false alarms while operating on client's computers. Clean file which is classified as malware in previous heuristic analysis, where its feature vector looked alike previously seen extensive and mixed large malware sample set, looks similar to clean files when compared to filtered small context aware sample sets.

Already deployed and used heuristic analysis of false positive samples is being corrected by manual operations and signature development techniques in most of the systems. With proposed approach a new automated method to lower false positive rate of already operating heuristic analysis system will be possible.

Invention method also provides possibility for combining multiple context information (which already collected and evaluated within the deployed system) and reveal it as new rule based detection techniques. It is also possible to use this information as separate analysis components inside heuristic analysis after some validation stages.

Additionally, apart from using new context aware classifiers to reduce false positive rates, they could be used for precise detection of some type of malware or clean samples. Since these classifiers will be trained on limited set of samples that have the same characteristic of context information, some can choose a context that differentiates a malware family from all other malware samples. So using new context aware classifier to detect this type of malware family can be also introduced to cloud based heuristic analysis system.

DETAILED DESCRIPTION

The present invention discloses methods and systems to decrease the false positive rate of statistical (heuristic) malware analysis and detection processes by introducing to the system new additional context aware classifiers using available contextual information (such as file name, file path, parent directories, etc) to narrow down the search space. Here false positive (FP) samples are benign (clean) files that were labelled as malware in the malware detection systems.

Figure 1:
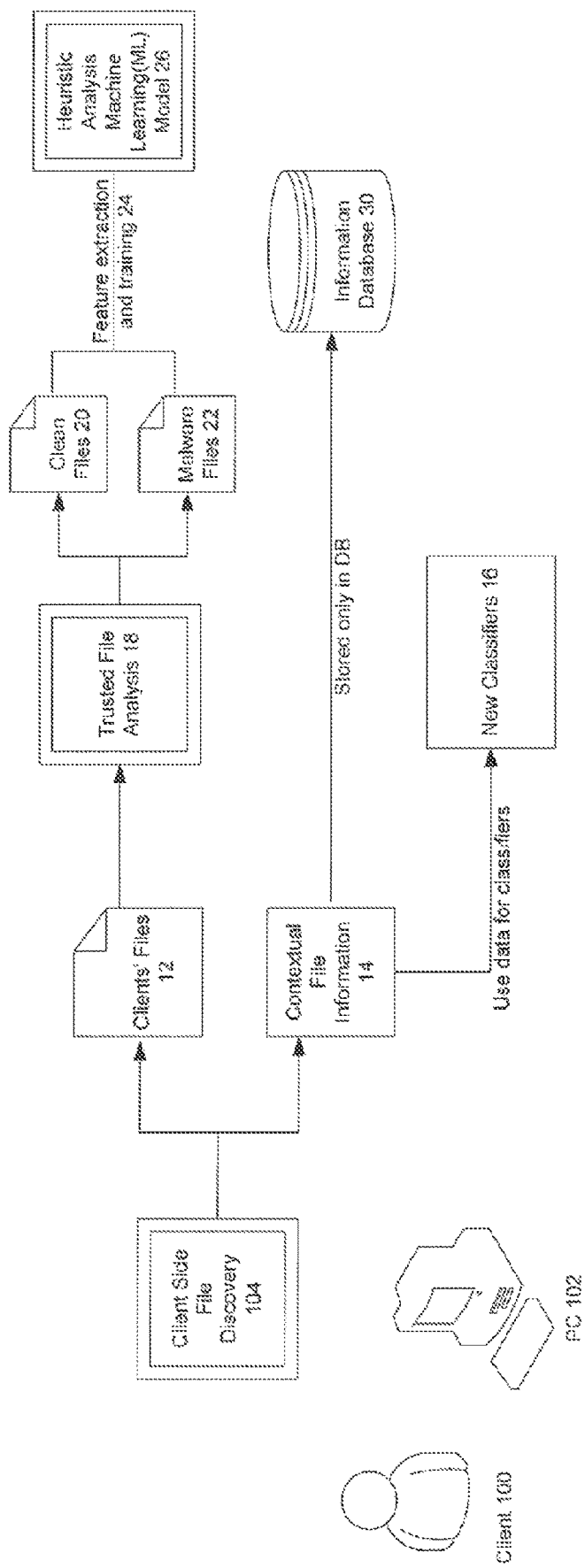
FIG. 1 is a depiction of general scheme of the invention.

FIG. 1 shows a depiction of the general scheme of the present invention. There is a client 100 who can be any consumer interested in using cloud based malware analysis software on their personal/enterprise computers 102. Cloud based malware analysis software detects and analyses software, running on computer 102 of client 100, checks file's hashes and signatures from cloud, sends binaries to cloud for further usage or analysis. Also, there is a client side file discovery 104 that is cloud based malware analysis system software running on computer 102 of client 100 and crawling all existing files in file system and each incoming new file. Client's files 12 are binary files gathered from client's computer 102. Contextual file information 14 comprises external information that is collected without manual interference, apart from binary of the sample. This contextual file information 14 helps to group samples under some categorical information, for example: file name, file path, file download location, file download source, etc. Contextual file information 14 will be used further in proposed by invention new classifiers 16. Classifiers are statistical models, trained with previously labelled samples as malware and clean and being used to give a statistical probability between 0.0-100.0 indicating if sample is malware or not. These heuristic results basically show to what extent new unknown sample is similar to malware sample. Also, there occurs trusted file analysis 18, non-heuristic malware detection, that involves signature based detection, certificate validation or manual analysis by human malware experts. Analysis verdict is trusted, having almost 100% reliability. Trusted file analysis detects clean files 20 or malware files 22. Clean files 20 are legitimate and include no harmful activity to client's computer 102 and data. Malware files 22 are developed for achieving or performing something illegal with the purpose of causing damage to client. Afterwards static analysis feature extraction and training process 24 provide extraction of static binary file features from samples that will be used in machine learning (ML) model 26 generation. In training phase, chosen machine learning classification algorithm will be used to train ML model. Machine learning model 26 here is statistical binary classifier to classify unknown samples. In order to train and generate these machine learning models 26, already labelled training sample sets are needed. Training samples of each new context aware classifier, defined in the scope of this invention, will be samples that were detected as clean or malware by trusted verdict sources. Furthermore, all of these samples will have the same contextual information that new additional classifier 16 planned to operate on. This new classifier 16 will be used to re-classify any sample that is labelled as malware by heuristic malware detection system 28 and has the same contextual information 14 in order to ensure that this heuristic result is not a false alarm. Static malware detection 28 analyzes binary files 12 by looking only static file properties and file data without running the sample. There is information database 30 that keeps relations between contextual information 14 and binary samples.

Figure 2:
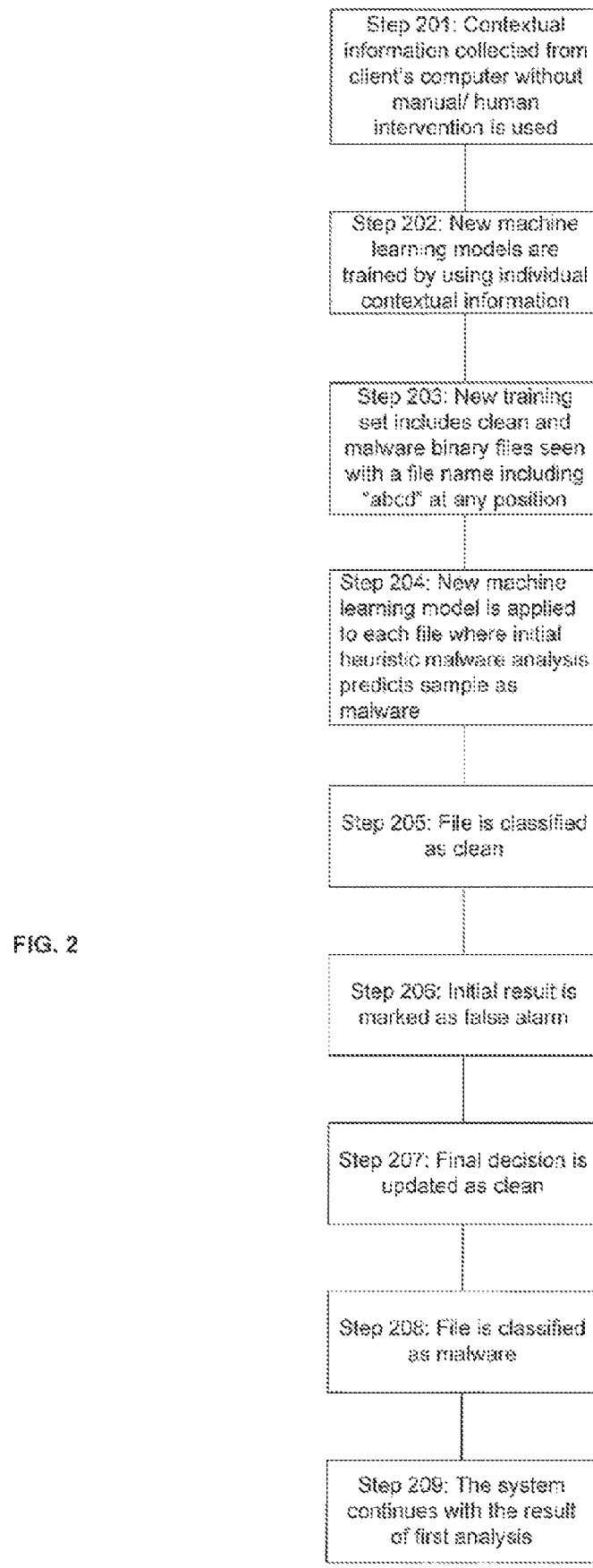
FIG. 2 is a flowchart of one embodiment of the invention where three major stages constitutively involved in the invention method is presented.

FIG. 2 shows the flowchart where three major stages constitutively involved in the invention method is presented. At the first stage, step 201, the contextual information 14 that is collected from client's computer 102 without any manual/human intervention is used. In step 202 new machine learning models 26 for malware detection are trained by using individual contextual information for each new context aware machine learning model. So, for one context information 14 (such as file name including term: "abcd" at any position but consecutively) already used training data samples are filtered using this context data, and thus new machine learning model 26 is trained. In step 203 new training set includes clean 20 and malware 22 binary files seen with a file name including "abcd" at any position. At the second stage, step 204, newly developed machine learning model 26 is applied to each file 12 where initial heuristic malware analysis predicts sample as malware and sample has the same contextual information 14 as in newly developed context aware machine learning model. At the third stage, step 205, file is classified as clean. In step 206 initial result is marked as false alarm and final decision is updated as clean, step 207. In step 208 file is classified as malware. In step 209 the system continues with the result of first analysis.

Figure 3A:
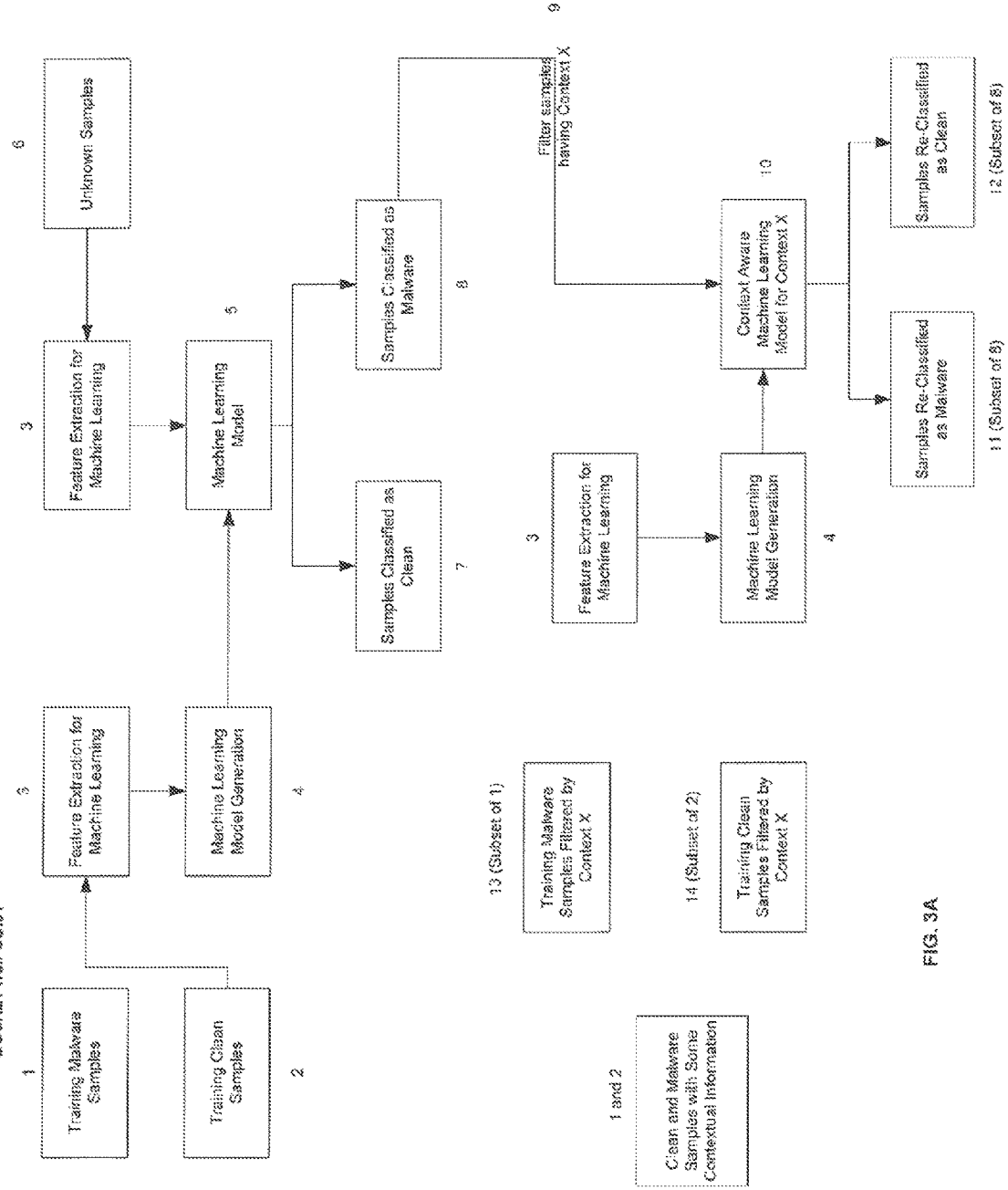
FIG. 3A is a depiction of another embodiment of the invention where architecture of invention model with additional classifiers used in statistical malware detection system is presented.
Figure 3B:
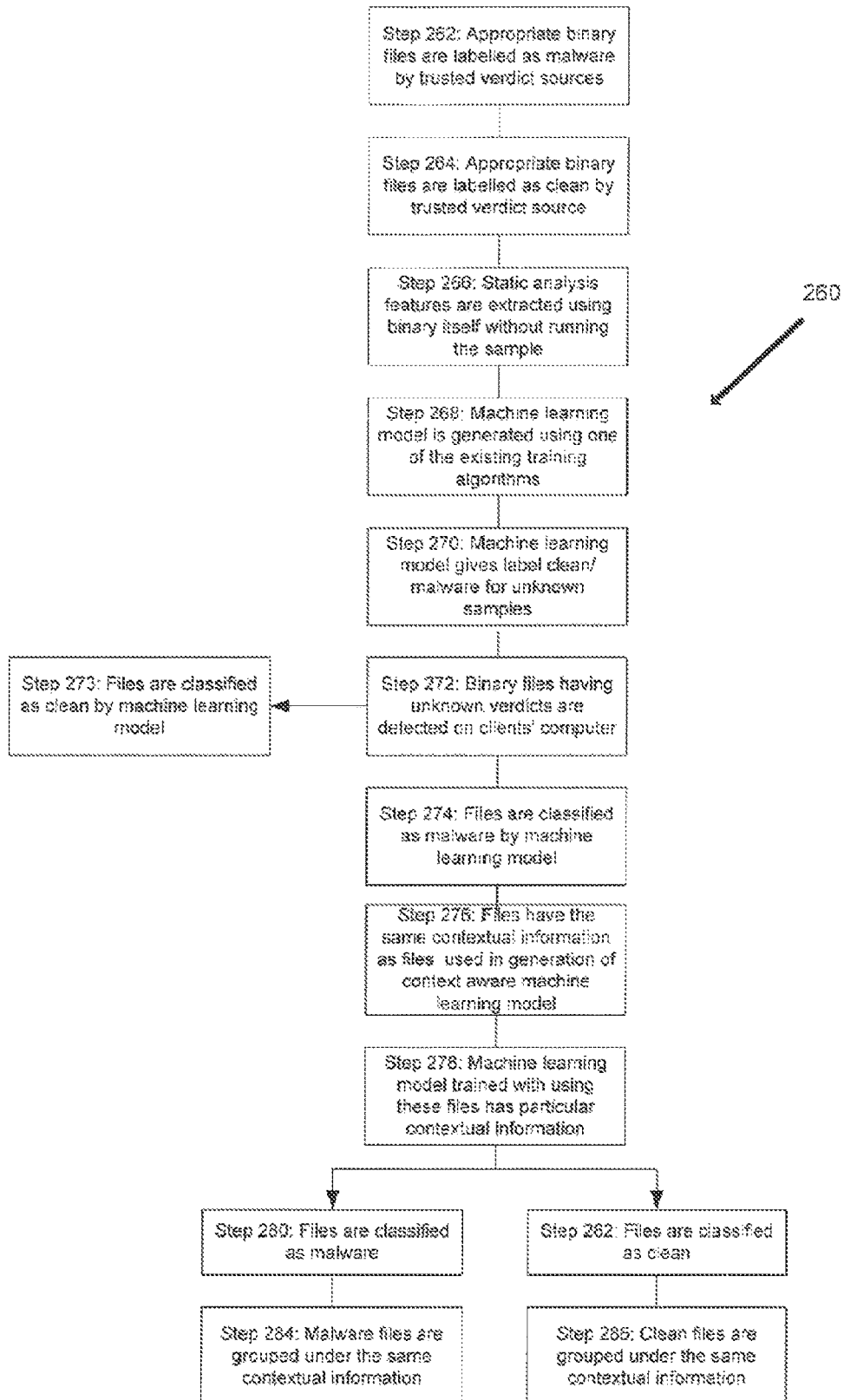
FIG. 3B is a flowchart of another embodiment of the invention where architecture of invention model with additional classifiers used in statistical malware detection system is presented.

FIGS. 3A and 3B show the depiction and flowchart of another embodiment of the invention where architecture of invention model with additional classifiers 16 used in statistical malware detection system 28 is presented. In step 262 appropriate binary files 12 are labelled as malware 22 by trusted verdict sources. In step 262 appropriate binary files 12 are labelled as clean by trusted verdict source. In step 266 static analysis features 24 are extracted using binary itself, without running the sample. In step 268 machine learning model 26 is generated using one of the existing training algorithms. In step 270 machine learning model 26 used in binary classification gives labels clean/malware for unknown samples. In step 272 binary files 12 having unknown verdicts are detected on clients' computer 6. In step 273 files 12 are classified as clean by machine learning model 26. In step 274 files 12 are classified as malware by machine learning model 26. In step 276 files 12 classified as malware by machine learning model 26 have the same contextual information 14 as files 12 used in generation of context aware machine learning model. In step 278 machine learning model 26 trained with using files 12 (subset of 1 & subset of 2) has particular contextual information 14 (Context X). In step 280 files 12 are classified as malware by context aware machine learning model. In step 282 files 12 are classified as clean by context aware machine learning model. In step 284 malware files 22 are grouped under the same contextual information 14, Context X. In step 286 clean files 20 are grouped under the same contextual information 14, Context X.

Figure 4:
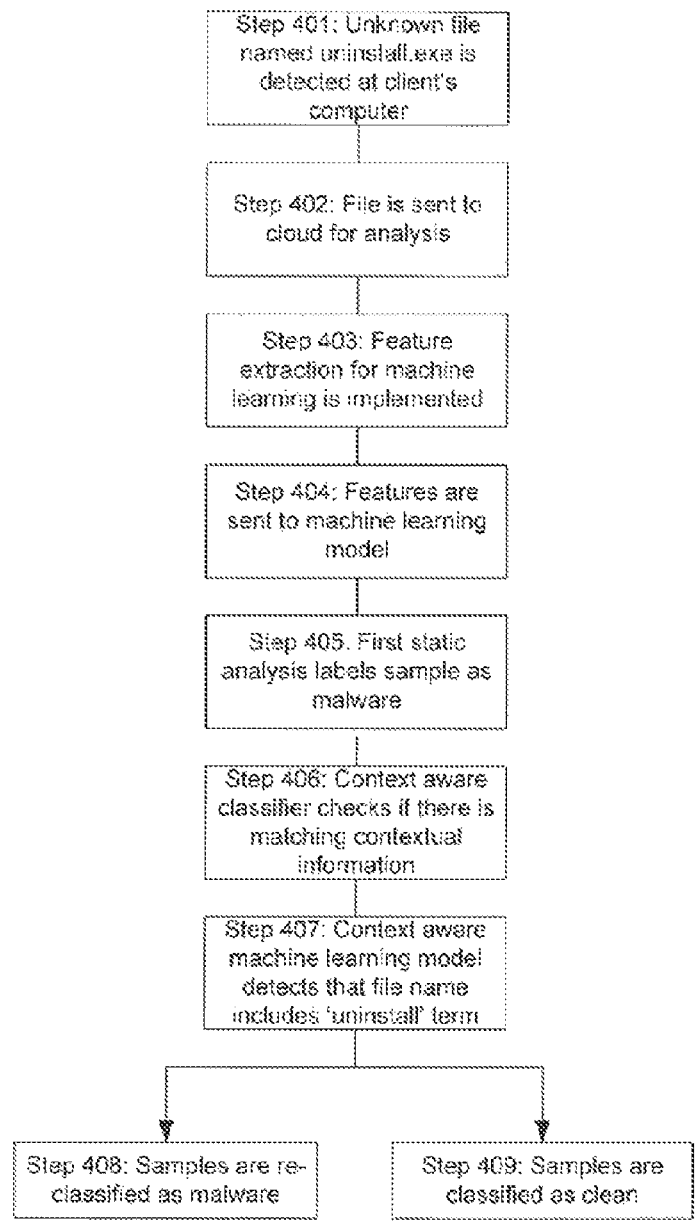
FIG. 4 is a flowchart of another embodiment of the invention where new classifier analyses unknown file.

FIG. 4 is a flowchart of the invention where new classifier 16 analyses unknown file 12. In step 401, unknown file 12 named uninstall.exe is detected at client's computer 102. In step 402, this file 12 is sent to cloud for analysis 4. In step 403 the feature extraction for machine learning is implemented. In step 404 features are sent to machine learning model 26. In step 405, first static analysis 24, using statistical malware classification system, labels sample as malware 22. In step 406 previously trained context aware classifier 16 (malware and clean files has 'uninstall' term in their names used in training) is being used to re-classify the sample; it checks if there is matching contextual information 14. In step 407 context aware machine learning model 26 for contextual information detects that file name includes 'uninstall' term. In step 408 samples are re-classified as malware files 22. In step 409 samples are classified as clean files 20. The benefit of context aware classifier 16 in this case can be monitored by keeping track of how many false positive samples are corrected after introduction of context aware classifiers 16. This accuracy depends both on number of samples filtered by the same contextual information (suitability of sample in classification with new classifier) and false positive rate of relevant additional classifier.

Figure 5:
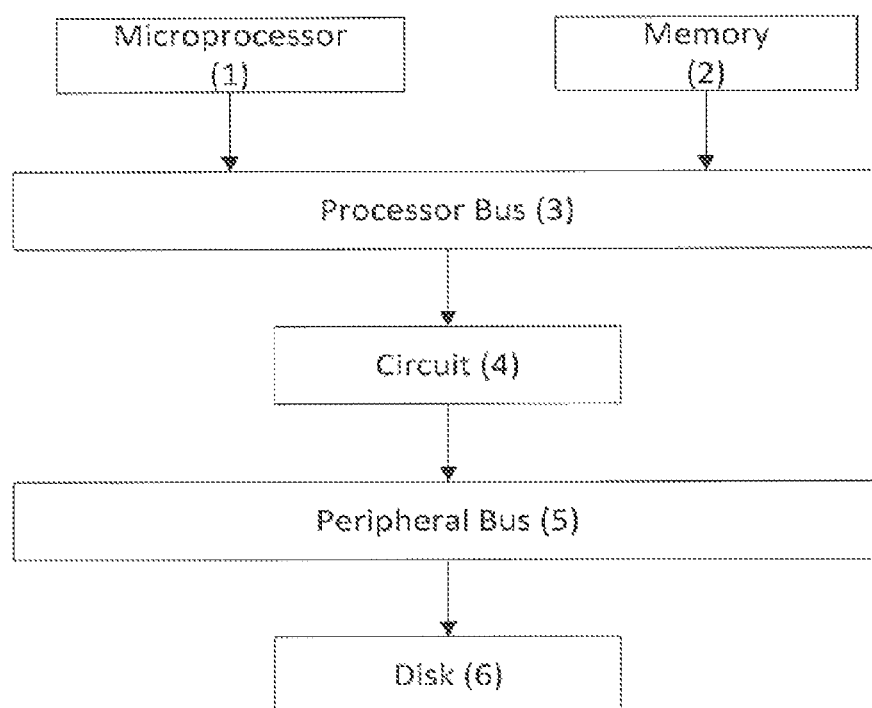
FIG. 5 is a schematic illustration of the connections of a computing system.
Figure 6:
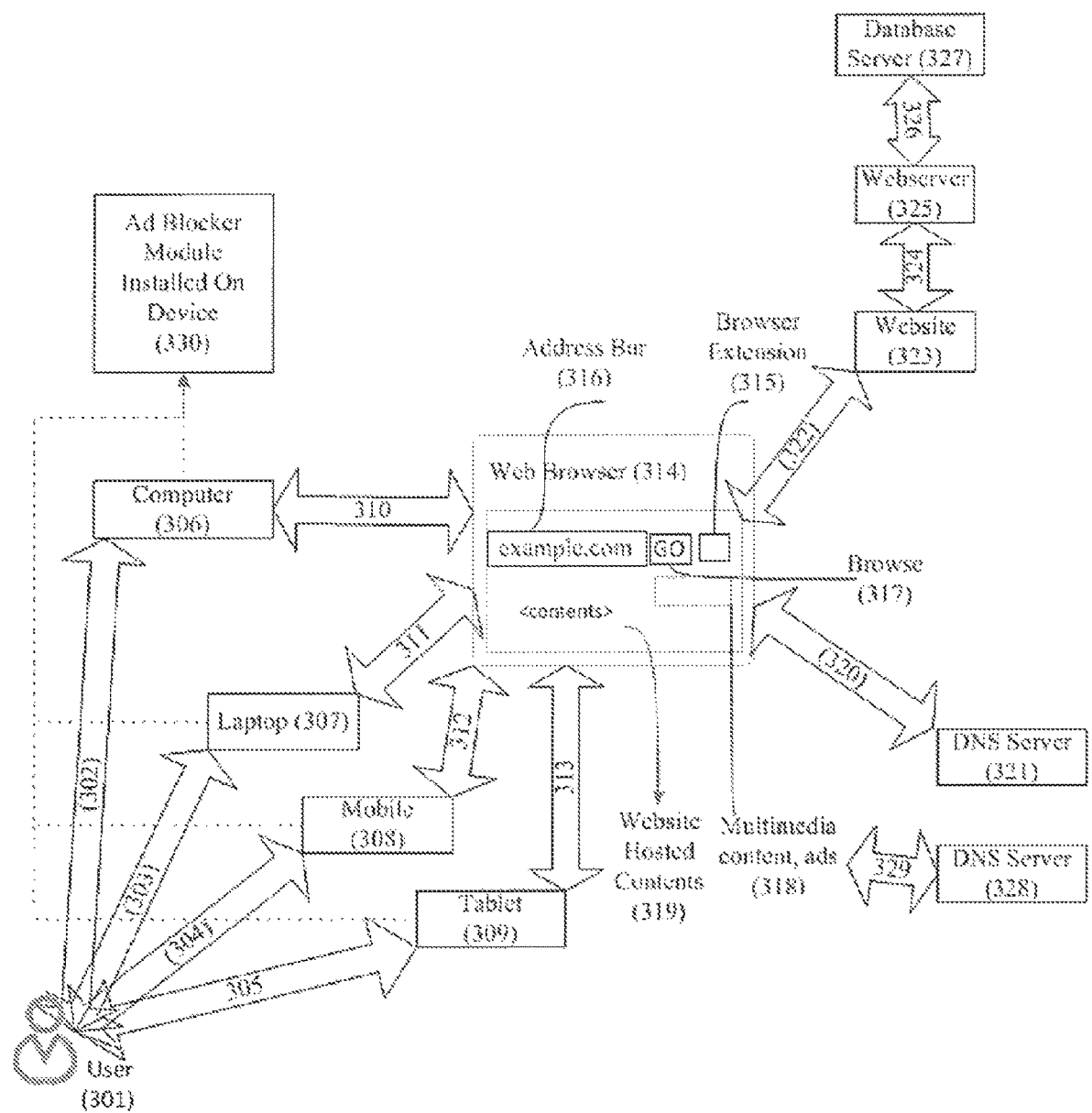
FIG. 6 is a schematic illustration showing how a user browses Internet and how different components act together to complete that browsing experience.
Figure 7:
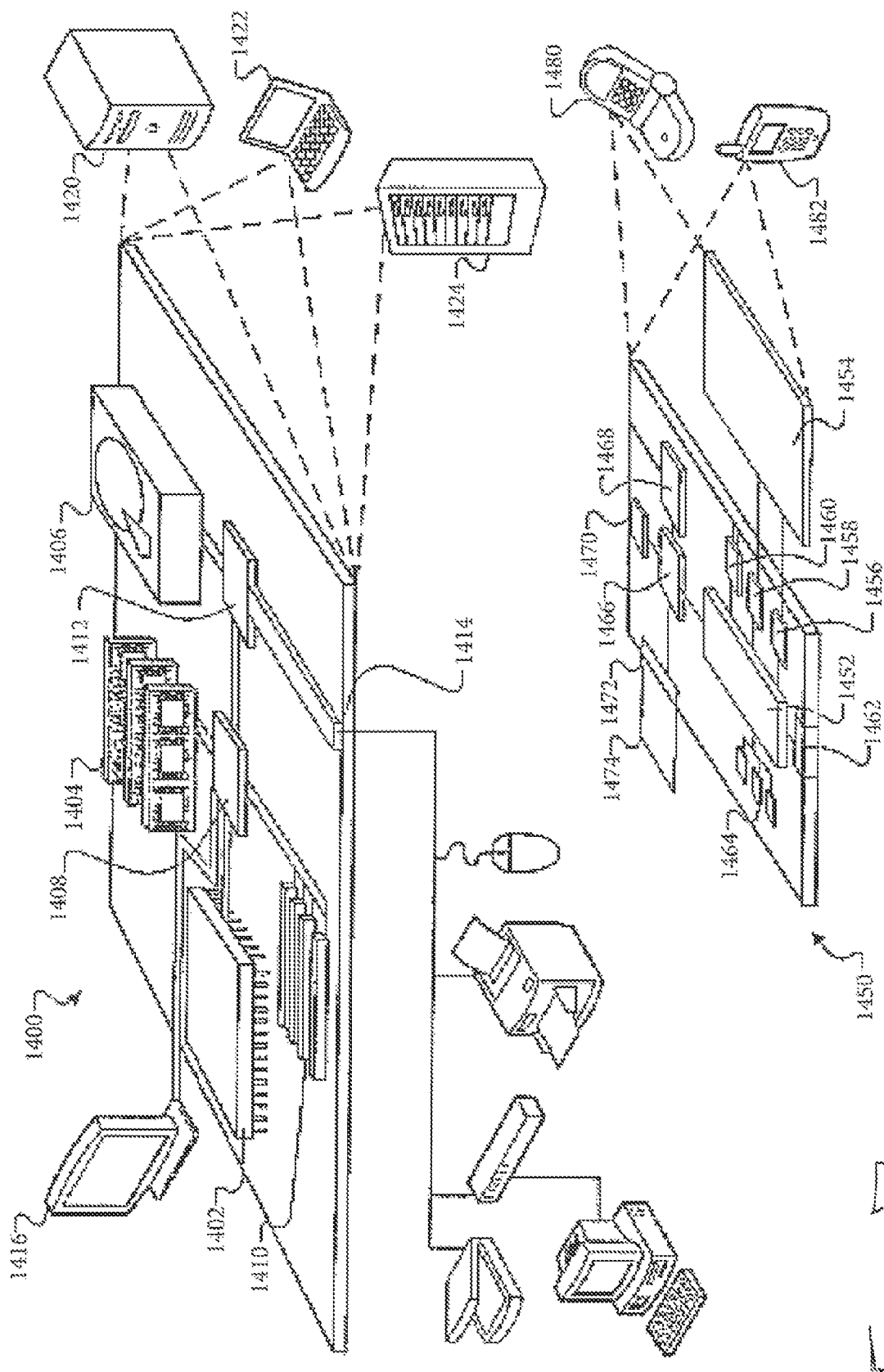
FIG. 7 is an illustration of a computer and mobile devices and their components.

The present invention is used with the following FIGS. 5, 6, and 7 of computer systems, components, and internet access. FIG. 5 illustrates a system of a computer or device which includes a microprocessor 1 and a memory 2 which are coupled to a processor bus 3 which is coupled to a peripheral bus 5 by circuitry 4. The bus 5 is communicatively coupled to a disk 6. It should be understood that any number of additional peripheral devices are communicatively coupled to the peripheral bus 5 in embodiments of the invention. Further, the processor bus 3, the circuitry 4 and the peripheral bus 5 compose a bus system for computing system 10 in various embodiments of the invention. The microprocessor 1 starts disk access commands to access the disk 6. Commands are passed through the processor bus 3 via the circuitry 4 to the peripheral bus 5 which initiates the disk access commands to the disk 6. In various embodiments of the invention, the present system intercepts the disk access commands which are to be passed to the hard disk.

FIG. 6 is a description of how communication works when the web is browsed and shows that a user (301) can use computer (306), laptop (307), mobile (308) or a tablet (309) to launch a web browser (314) installed on that specific device to browse a specific website (323). The user can enter an address of some chosen web site on the address bar (316) and press a browser specific option to indicate to the browser to browse, as shown in FIG. 6 via button "Go" (317). After a user presses a browser specific option to navigate to a given web page as shown in FIG. 6 via button Go (317), web browser (314) first connects to domain name server (321) as configured in that device to resolve the web site domain to the IP address. Any user initiated request in browser page goes through to web site (323) as show via flow arrow 322 and then to web server (325) where web site (323) is hosted. Web server (325) in turn may connect to one or more database server(s) (327) to return specific user requested contents back to web browser (314). Multimedia content and advertisements (318) are received from server 328 as shown by flow arrow 329.

In FIG. 6, browser extension (315) is shown to be installed in web browser that has capability to block any outgoing web request; and at the same time can block any html element present on web page using some pre-defined blacklist of outgoing URLs. At the same time a device may also be using one or other ad blocker (330) installed on device that can block any outgoing call irrespective of application calling and thus such an application can block ad requests originating from any application including web browsers. Considering such ad blockers (330) are installed on device, they have complete access to all code passed onto web page and can inject any specific piece of html code that can block any HTML elements present on web page. Thus, depending on device setup, a web request may be blocked at browser level via ad blocker installed as browser extension (315) or may be blocked at network level using software module installed on device at network level and acting as ad blocker (330).

FIG. 7 shows an example of a generic computer device 1400 and a generic mobile computer device 1450, which may be used to implement the processes described herein, including the mobile-side and server-side processes for installing a computer program from a mobile device to a computer. Computing device 1400 is intended to represent various forms of digital computers, such as laptops, desktops, workstations, personal digital assistants, servers, blade servers, mainframes, and other appropriate computers. Computing device 1450 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 1400 includes a processor 1402, memory 1404, a storage device 1406, a high-speed interface 1408 connecting to memory 1404 and high-speed expansion ports 1410, and a low speed interface 1412 connecting to low speed bus 1414 and storage device 1406. Each of the components 1402, 1404, 1406, 1408, 1410, and 1412 are interconnected using various busses, and may be mounted on a common motherboard or in other manners as appropriate. The processor 1402 can process instructions for execution within the computing device 1400, including instructions stored in the memory 1404 or on the storage device 1406 to display graphical information for a GUI on an external input/output device, such as display 1416 coupled to high speed interface 1408. In other implementations, multiple processors and/or multiple busses may be used, as appropriate, along with multiple memories and types of memory. Also, multiple computing devices 1400 may be connected, with each device providing portions of the necessary operations (e.g., as a server bank, a group of blade servers, or a multi-processor system).

The memory 1404 stores information within the computing device 1400. In one implementation, the memory 1404 is a volatile memory unit or units. In another implementation, the memory 1404 is a non-volatile memory unit or units. The memory 1404 may also be another form of computer-readable medium, such as a magnetic or optical disk.

The storage device 1406 is capable of providing mass storage for the computing device 1400. In one implementation, the storage device 1406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 1404, the storage device 1406, or memory on processor 1402.

The high speed controller 1408 manages bandwidth-intensive operations for the computing device 1400, while the low speed controller 1412 manages lower bandwidth-intensive operations. Such allocation of functions is exemplary only. In one implementation, the high-speed controller 1408 is coupled to memory 1404, display 1416 (e.g., through a graphics processor or accelerator), and to high-speed expansion ports 1410, which may accept various expansion cards (not shown). In the implementation, low-speed controller 1412 is coupled to storage device 1406 and low-speed expansion port 1414. The low-speed expansion port 1414, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 1400 may be implemented in a number of different forms, as shown in the figure. For example, it may be implemented as a standard server 1420, or multiple times in a group of such servers. It may also be implemented as part of a rack server system 1424. In addition, it may be implemented in a personal computer such as a laptop computer 1422. Alternatively, components from computing device 1400 may be combined with other components in a mobile device (not shown), such as device 1450. Each of such devices may contain one or more of computing device 1400, 1450, and an entire system may be made up of multiple computing devices 1400, 1450 communicating with each other.

Computing device 1450 includes a processor 1452, memory 1464, an input/output device such as a display 1454, a communication interface 1466, and a transceiver 1468, among other components. The device 1450 may also be provided with a storage device, such as a microdrive or other device, to provide additional storage. Each of the components 1450, 1452, 1464, 1454, 1466, and 1468 are interconnected using various busses, and several of the components may be mounted on a common motherboard or in other manners as appropriate.

The processor 1452 can execute instructions within the computing device 1450, including instructions stored in the memory 1464. The processor may be implemented as a chipset of chips that include separate and multiple analog and digital processors. The processor may provide, for example, for coordination of the other components of the device 1450, such as control of user interfaces, applications run by device 1450, and wireless communication by device 1450.

Processor 1452 may communicate with a user through control interface 1458 and display interface 1456 coupled to a display 1454. The display 1454 may be, for example, a TFT LCD (Thin-Film-Transistor Liquid Crystal Display) or an OLED (Organic Light Emitting Diode) display, or other appropriate display technology. The display interface 1456 may comprise appropriate circuitry for driving the display 1454 to present graphical and other information to a user. The control interface 1458 may receive commands from a user and convert them for submission to the processor 1452. In addition, an external interface 1462 may be provided in communication with processor 1452, so as to enable near area communication of device 1450 with other devices. External interface 1462 may provide, for example, for wired communication in some implementations, or for wireless communication in other implementations, and multiple interfaces may also be used.

The memory 1464 stores information within the computing device 1450. The memory 1464 can be implemented as one or more of a computer-readable medium or media, a volatile memory unit or units, or a non-volatile memory unit or units. Expansion memory 1474 may also be provided and connected to device 1450 through expansion interface 1472, which may include, for example, a SIMM (Single In Line Memory Module) card interface. Such expansion memory 1474 may provide extra storage space for device 1450, or may also store applications or other information for device 1450. Specifically, expansion memory 1474 may include instructions to carry out or supplement the processes described above, and may include secure information also. Thus, for example, expansion memory 1474 may be provided as a security module for device 1450, and may be programmed with instructions that permit secure use of device 1450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1464, expansion memory 1474, memory on processor 1452, or a propagated signal that may be received, for example, over transceiver 1468 or external interface 1462.

Device 1450 may communicate wirelessly through communication interface 1466, which may include digital signal processing circuitry where necessary. Communication interface 1466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1468. In addition, short-range communication may occur, such as using a Bluetooth, Wi-Fi, or other such transceiver (not shown). In addition, GPS (Global Positioning System) receiver module 1470 may provide additional navigation- and location-related wireless data to device 1450, which may be used as appropriate by applications running on device 1450.

Device 1450 may also communicate audibly using audio codec 1460, which may receive spoken information from a user and convert it to usable digital information. Audio codec 1460 may likewise generate audible sound for a user, such as through a speaker, e.g., in a handset of device 1450. Such sound may include sound from voice telephone calls, may include recorded sound (e.g., voice messages, music files, etc.) and may also include sound generated by applications operating on device 1450.

The computing device 1450 may be implemented in a number of different forms, as shown in the figure. For example, it may be implemented as a cellular telephone 1480. It may also be implemented as part of a smartphone 1482, personal digital assistant, tablet, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" or "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "computer readable storage medium" may be any tangible medium (but not a signal medium—which is defined below) that can contain, or store a program. The terms "machine readable medium," "computer-readable medium," or "computer readable storage medium" are all non-transitory in their nature and definition. Non-transitory computer readable media comprise all computer-readable media except for a transitory, propagating signal.

The term "machine-readable signal" refers to any signal used to provide machine instructions and/or data to a programmable processor. A "computer readable signal medium" may be any computer readable medium that is not a computer readable storage medium and that can communicate, propagate, or transport a program.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

Elements of different implementations described herein may be combined to form other implementations not specifically set forth above. Elements may be left out of the processes, computer programs, Web pages, etc. described herein without adversely affecting their operation. Furthermore, various separate elements may be combined into one or more individual elements to perform the functions described herein.

The invention is not restricted to the details of the foregoing embodiments. The invention extends to any novel one, or any novel combination, of the features disclosed in this specification (including any accompanying claims, abstract and drawings), or to any novel one, or any novel combination, of the steps of any method or process so disclosed.

What is claimed is:

1. A method to decrease the false positive rate of cloud based heuristic malware analysis and detection processes, the method comprising the steps of:
   introducing context aware classifiers using available contextual information collected from a client computer without any manual intervention, said contextual information stored in an information database which maintains relations between said contextual information and binary files;
   sending said context aware classifiers to cloud for analysis;
   training new machine learning models for malware detection based on individual contextual information for each new context aware machine learning model;
   using newly developed machine learning model on each file where an initial heuristic malware analysis predicts a sample as malware and said sample has identical contextual information as said newly developed context aware machine learning model;
   marking said initial heuristic malware analysis as false alarm if file was classified as clean during use with said newly developed machine learning model and updating final decision as clean; and
   continuing with the result of said initial heuristic malware analysis if said file was classified as malware during use with said newly developed machine learning model;
   detecting unknown file named uninstall.exe at said client computer;
   sending said unknown file to cloud for analysis;
   implementing feature extraction for machine learning;
   sending features from said feature extraction to said newly developed machine learning model;
   labelling, by a first static analysis, said unknown file as malware;
   checking, by previously trained context aware classifier, if there is matching contextual information;
   detecting, by context aware machine learning model, that said unknown file name includes 'uninstall' term;
   re-classifying said unknown file as a malware file or classifying said unknown file as a clean file.

2. The method according to claim 1, further comprising:
   labelling appropriate binary files as malware by a trusted verdict source;
   labelling by the trusted verdict source appropriate binary files as clean;
   extracting static analysis features by using binary itself, without running the sample;
   generating machine learning model using one of the existing training algorithms;
   labelling unknown samples by said machine learning model as clean or malware for said unknown samples;
   detecting binary files having unknown verdicts on said client computer;
   classifying files as clean by said machine learning model;
   classifying files as malware by said machine learning model;

detecting that malware files have identical contextual information as files used in generation of context aware machine learning model;
receiving particular contextual information by said machine learning model trained with clean and malware samples;
classifying files as malware by context aware machine learning model;
classifying files as clean by said context aware machine learning model;
grouping malware files under the same contextual information; and
grouping clean files under the same contextual information.

3. The method according to claim 1, further comprising after the last step of the method, the steps of:
combining multiple context information which have been collected and evaluated and revealing said combined multiple context information as a rule based detection technique.

4. The method according to claim 1, further comprising after the last step of the method, the steps of:
combining multiple context information which have been collected and evaluated and using said combined multiple context information as separate analysis components inside heuristic analysis after validation stages.

* * * * *